United States Patent
Bex et al.

(10) Patent No.: US 9,440,620 B2
(45) Date of Patent: Sep. 13, 2016

(54) WIPING DEVICE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 14/130,004

(22) PCT Filed: May 29, 2012

(86) PCT No.: PCT/EP2012/059947
§ 371 (c)(1),
(2), (4) Date: Dec. 30, 2013

(87) PCT Pub. No.: WO2013/000647
PCT Pub. Date: Jan. 3, 2013

(65) Prior Publication Data
US 2014/0215746 A1  Aug. 7, 2014

(30) Foreign Application Priority Data
Jun. 28, 2011  (DE) .................. 10 2011 078 198

(51) Int. Cl.
*B60S 1/40* (2006.01)
*B60S 1/38* (2006.01)

(52) U.S. Cl.
CPC ............ *B60S 1/4003* (2013.01); *B60S 1/3851* (2013.01); *B60S 1/3853* (2013.01); *B60S 1/3858* (2013.01); *B60S 1/3881* (2013.01)

(58) Field of Classification Search
CPC .. B60S 1/3858; B60S 1/3853; B60S 1/3851; B60S 1/3881; B60S 1/381; B60S 1/3849; B60S 1/3877
See application file for complete search history.

(56) References Cited

U.S. PATENT DOCUMENTS

| 2008/0263809 A1* | 10/2008 | Bousset | B60S 1/386 15/250.32 |
| 2008/0295272 A1* | 12/2008 | Jarasson | B60S 1/3806 15/250.32 |
| 2009/0056049 A1* | 3/2009 | Jarasson | B60S 1/381 15/250.32 |
| 2010/0293737 A1* | 11/2010 | Ollier | B60S 1/3858 15/250.34 |

FOREIGN PATENT DOCUMENTS

| CN | 201816558 | 5/2011 |
| DE | 19645170 | 5/1998 |
| DE | 10043427 | 3/2002 |
| DE | 10036115 | 1/2003 |
| FR | 2925437 | 6/2009 |

OTHER PUBLICATIONS

International Search Report for Application No. PCT/EP2012/059947 dated Aug. 30, 2012 (2 pages).

* cited by examiner

*Primary Examiner* — Gary Graham
(74) *Attorney, Agent, or Firm* — Michael Best & Friedrich LLP

(57) ABSTRACT

The invention relates to a wiping device, in particular a wiping device for a motor vehicle pane, comprising a retaining element (10a-10c) with at least one longitudinal guide channel (18a-18c) for guiding at least one spring element (20a-20c). According to the invention, the retaining element (10a-10c) has at least one mounting code (34a-34c) that is designed to define exactly one explicit mounting position with a wiper blade adapter (12a-12c).

23 Claims, 4 Drawing Sheets

WIPING DEVICE

BACKGROUND OF THE INVENTION

A wiping device is known, in particular a wiping device for a motor vehicle pane, comprising a retaining element which has at least one longitudinal guide channel for guiding at least one spring element.

SUMMARY OF THE INVENTION

The invention is based on a wiping device, in particular a wiping device for a motor vehicle pane, comprising a retaining element which has at least one longitudinal guide channel for guiding at least one spring element.

It is proposed that the retaining element has at least one mounting code which is provided to define exactly one explicit mounting position with a wiper blade adapter, whereby errors when mounting the wiping device are able to be advantageously avoided. "Retaining element" is intended to be understood in this context, in particular, as an element which is provided to connect together positively a wind spoiler element, a spring element and a wiper strip. "Wind spoiler element" is intended to be understood in this context, in particular, as an element which is provided to deflect driving wind acting on the wiping device and/or to be used for pressing a wiper strip onto a vehicle pane. "Wiper strip" is intended to be understood in this context, in particular, as a strip which is provided to wipe a vehicle pane. "Spring element" is intended to be understood in this context, in particular, as a spring-elastic element which has at least one dimension which in a normal operating state is able to be resiliently altered by at least 10%, in particular by at least 20%, preferably by at least 30% and particularly advantageously by at least 50%, and which in particular produces a counter-force which is dependent on an alteration of the dimension and preferably proportional to the alteration, said counter-force counteracting the alteration. "Longitudinal guide channel" is intended to be understood in this context, in particular, as a guide channel which extends parallel to a longitudinal direction of the retaining element. Preferably, the longitudinal guide channel comprises a free space as well as at least one channel wall defining the free space. "Longitudinal direction" is intended to be understood in this context, in particular, as a direction which extends substantially parallel to a longitudinal dimension of the retaining element. "Longitudinal dimension" is intended to be understood in this context, in particular, as the greatest possible dimension. "Substantially" is intended to be understood in this context, in particular, as a deviation of less than 10°, preferably less than 5°. A "dimension" of an element is intended to be understood in this context, in particular, as a maximum spacing between two points of a vertical projection of the element on a plane. "Mounting code" is intended to be understood in this context, in particular, as a technical device which is provided to guide at least two components during mounting into exactly one explicit mounting position, wherein it is possible to avoid undesirable, incorrect mounting of the components. "Wiper blade adapter" is intended to be understood in this context, in particular, as an adapter which has a contact region with a wiper blade component and is captively connected to the wiper blade component and is provided to provide a coupling region of the wiper blade component for coupling and/or bringing into contact with a wiper arm adapter. "Provided" is intended to be understood, in particular, as specifically designed and/or equipped.

In a further embodiment of the invention, it is proposed that the retaining element comprises at least two fastening shapes which have contours which are configured differently from one another and are provided to define exactly one explicit mounting position with a wiper blade adapter, whereby mounting errors are able to be particularly advantageously avoided in a simple manner. "Fastening shape" is intended to be understood in this context, in particular, as a shape which is provided to form a positive connection with a further component during a mounting process. Preferably, the fastening shape is formed by a recess.

It is also proposed that the retaining element is configured asymmetrically relative to a central plane extending perpendicular to a longitudinal direction of the retaining element, whereby correct mounting is able to be further simplified. "Central plane" is intended to be understood in this context, in particular, as a plane which extends through a central point of a longitudinal dimension of a component.

If the fastening shapes are arranged at least partially in at least one lateral wall which laterally defines the longitudinal guide channel, a particularly compact design of the wiper device may be achieved. "Laterally" is intended to be understood in this context, in particular, as viewed in a wiping direction. "Wiping direction" is intended to be understood in this context, in particular, as a direction in which in an operating state the wiping device moves relative to a surface to be wiped. Preferably, the wiping direction extends parallel to a surface to be wiped and/or perpendicular to a main orientation of the wiper strip.

Moreover, it is proposed that the fastening shapes have different longitudinal dimensions, whereby the contours may be of particularly simple design. "Longitudinal dimension" is intended to be understood in this context, in particular, as the greatest dimension which extends parallel to the longitudinal direction.

If the fastening shapes are arranged offset to one another, viewed in the longitudinal direction, the retaining element may be configured to be particularly stable. "Offset" is intended to be understood in this context, in particular, as meaning that there is at least one plane which extends perpendicular to the longitudinal direction and exactly intersects one of the fastening shapes. Preferably, the fastening shapes are spaced apart from one another, viewed in the longitudinal direction. In each case, a region free of fastening recesses is arranged between the fastening shapes in which a plane which extends perpendicular to the longitudinal direction does not intersect a fastening shape.

A particularly secure mounting of the wiping device with a wiper arm adapter may be achieved when the wiping device has a wiper blade adapter which is provided to be coupled to the retaining element.

If the wiper blade adapter has at least one latching element which bears laterally against the retaining element in a mounted state and is provided to prevent a movement of the wiper blade adapter relative to the retaining element in a longitudinal direction, the wiping device may be mounted particularly rapidly. "Latching element" is intended to be understood in this context, in particular, as a spring-elastic element for producing a latching connection which is provided to be elastically deflected during the mounting process.

A particularly high operational reliability may be achieved when the wiping device has at least one securing means which is provided to secure the at least one latching element in an operating state.

BRIEF DESCRIPTION OF THE DRAWINGS

Further advantages are revealed from the following description of the drawings. Three exemplary embodiments of the invention are shown in the drawings. The drawings, the description and the claims contain numerous features in combination. The persons skilled in the art will also expediently consider the features individually and combine them to create further useful combinations.

In the drawings.

DETAILED DESCRIPTION

Figure 1:
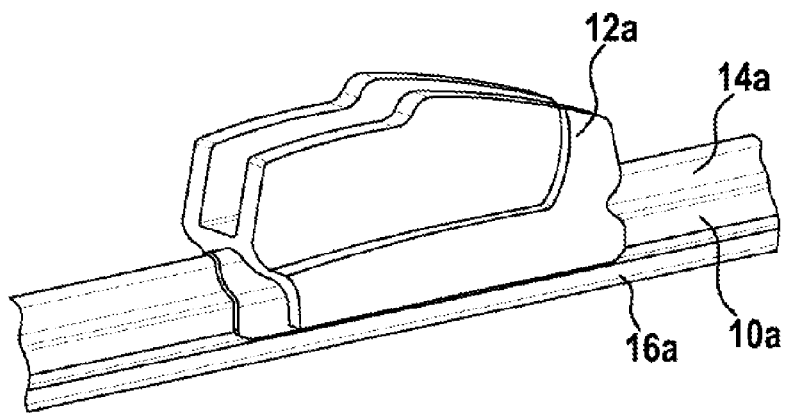
FIG. 1 shows a perspective view of a wiping device according to the invention comprising a retaining element.

FIG. 1 shows a perspective view of a wiping device according to the invention comprising a retaining element $10a$, a wiper blade adapter $12a$, a wind spoiler element $14a$ and a wiper strip $16a$ in a mounted state. The wiper blade adapter $12a$, the wind spoiler element $14a$ and the wiper strip $16a$ are fastened to the retaining element $10a$. The wiper blade adapter $12a$ is provided to be coupled to a wiper arm (not shown). In an operating state, i.e. when the wiper arm performs a wiping movement, the wiper strip $16a$ is moved via the retaining element $10a$ over a surface (not shown) to be wiped. When driving wind acts, the wind spoiler element $14a$ deflects said wind and presses the wiper strip $16a$ onto the surface to be wiped.

Figure 2:
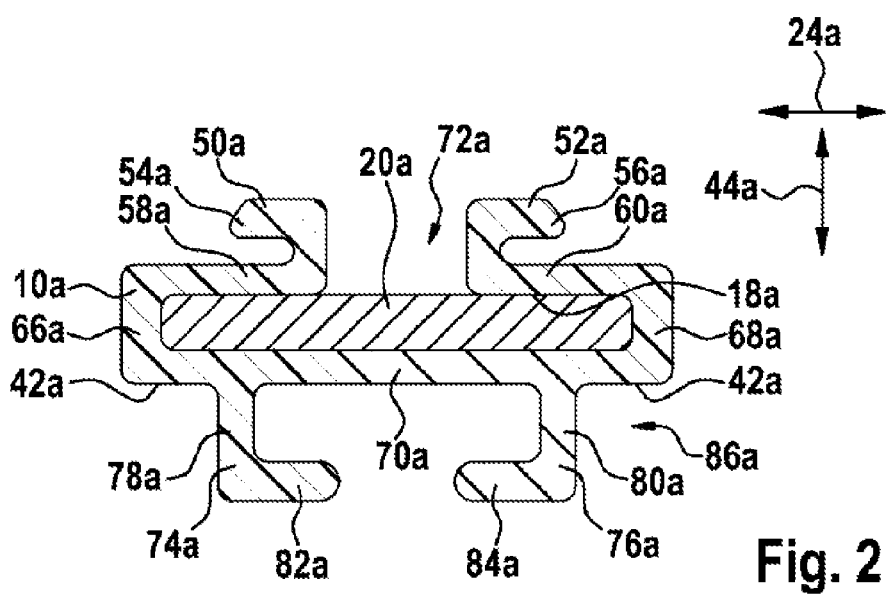
FIG. 2 shows a sectional view of the retaining element according to FIG. 1.

FIG. 2 shows the retaining element $10a$ which has a longitudinal guide channel $18a$ for guiding a spring element $20a$, in a sectional view. The cutting plane extends perpendicular to a longitudinal direction $22a$ of the retaining element $10a$. The retaining element $10a$ has two wind spoiler fastening elements $50a$, $52a$. The wind spoiler fastening elements $50a$, $52a$ are formed integrally with the retaining element $10a$. The wind spoiler fastening elements $50a$, $52a$ at the free ends $54a$, $56a$ thereof face in directions facing away from one another. Moreover, the wind spoiler fastening elements $50a$, $52a$ form two channel walls $58a$, $60a$ which adjoin the longitudinal guide channel $18a$ on a side remote from the wiper strip. The wiper spoiler fastening elements $50a$, $52a$ are configured in the shape of barbed hooks in the region of the free ends $54a$, $56a$ thereof. The ends $54a$, $56a$ in a mounted state are enclosed by a wind spoiler element $14a$.

For guiding the spring element $20a$, lateral walls $66a$, $68a$ of the longitudinal guide channel $18c$ adjoin the channel walls $58a$, $60a$. The channel walls $58a$, $60a$ in this case enclose a right angle with the lateral walls $66a$, $68a$. Moreover, an intermediate wall $70a$ is arranged on the lateral walls $66a$, $68a$, said intermediate wall terminating the longitudinal guide channel $18a$ in the direction of the wiper strip $16a$. The lateral walls $66a$, $68a$ extend from the intermediate wall $70a$ in a direction remote from the wiper strip $16a$. The retaining element $10a$ has a longitudinal opening $72a$ which opens the longitudinal guide channel $18a$ toward the wind spoiler element $14a$.

Two L-shaped guide profiles $74a$, $76a$ of the retaining element $10a$ are arranged on the intermediate wall $70a$. The guide profiles $74a$, $76a$ are configured integrally with the retaining element $10a$. The guide profiles $74a$, $76a$ in each case have a lateral guide $78a$, $80a$ and in each case a vertical guide $82a$, $84a$. The vertical guides $82a$, $84a$ in each case enclose with the lateral guides $78a$, $80a$ an angle of 90°. The lateral guides $78a$, $80a$ in each case enclose an angle of 90° relative to the intermediate wall $70a$. The guide profiles $74a$, $76a$ at their free ends of the vertical guides $82a$, $84a$ face in directions facing one another. The guide profiles $74a$, $76a$ and the intermediate wall $70a$ form a keder track $86a$ into which in a mounted state the wiper strip $16a$ is inserted.

The retaining element $10a$ is produced in one piece from polyethylene in an extrusion process. In this connection, a person skilled in the art will consider different synthetic materials which appear expedient, such as in particular polypropylene, polyamide, polyvinylchloride, polycarbonate and/or polystyrene.

Figure 3:
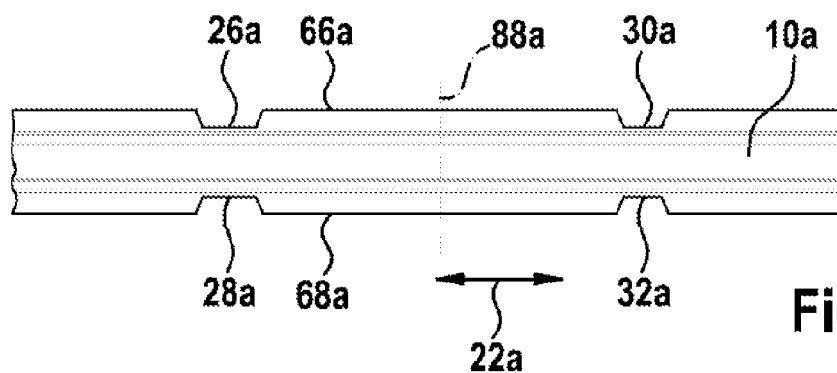
FIG. 3 shows a plan view of the retaining element according to FIG. 1.

FIG. 3 shows a plan view of the retaining element $10a$. The retaining element $10a$ has a mounting code $34a$ which exactly defines one explicit mounting position with the wiper blade adapter $12a$. To this end, the retaining element $10a$ has four fastening shapes $26a$, $28a$, $30a$, $32a$ which are configured as fastening recesses. The fastening recesses $26a$, $28a$, $30a$, $32a$ form in the mounted state a positive connection with a wiper blade adapter $12a$. The fastening shapes $26a$, $28a$, $30a$, $32a$, are arranged in the lateral walls $66a$, $68a$ which laterally define the longitudinal guide channel $18a$. On each side facing in a wiping direction of the retaining element $10a$, two fastening shapes $26a$, $28a$ and/or $30a$, $32a$ have trapezoidal contours which are configured differently from one another, whereby exactly one explicit mounting position is defined by a wiper blade adapter $12a$. By means of the different contours, the retaining element $10a$ is configured asymmetrically to a central plane $88a$ extending perpendicular to the longitudinal direction $22a$ of the retaining element $10a$. The fastening shapes $26a$, $28a$, $30a$, $32a$ are partially arranged in the lateral wall $66a$, $68a$ which laterally defines the longitudinal guide channel $18a$. The fastening shapes $26a$, $28a$ have different longitudinal dimensions. In this case, the maximum longitudinal dimension of the fastening shapes $30a$, $32a$ is 50% greater than the maximum longitudinal dimension of the fastening shapes $26a$, $28a$. Viewed in the longitudinal direction $22a$, the fastening shapes $26a$ and/or $28a$ are arranged offset relative to the fastening shapes $30a$ and/or $32a$.

Figure 4:
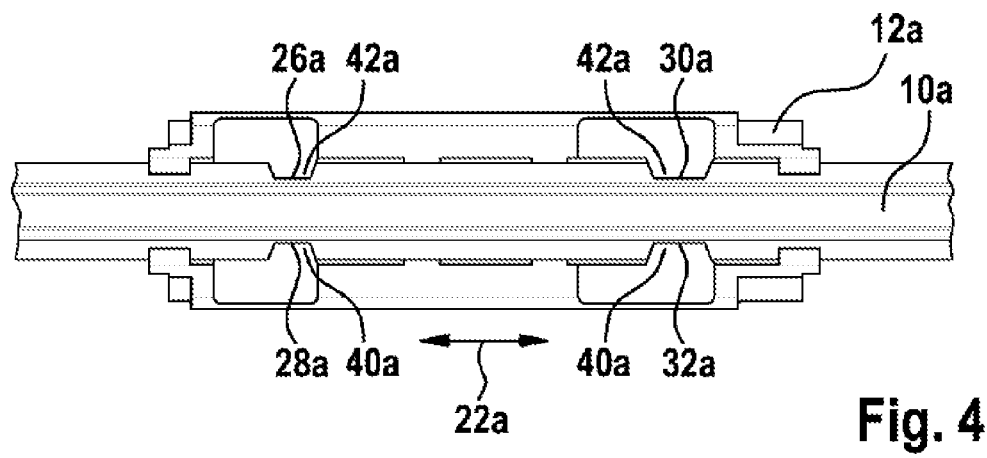
FIG. 4 shows a plan view of the retaining element according to FIG. 1 comprising a wiper blade adapter.

For mounting, the wiper blade adapter $12a$ is pushed in the longitudinal direction $22a$ onto the retaining element $10a$. The wiper blade adapter $12a$ has four latching elements $40a$, $42a$ which in a mounted state bear laterally against the retaining element $10a$ and prevent a movement of the wiper blade adapter $12a$ relative to the retaining element $10a$ in the longitudinal direction $22a$ (FIG. 4). The latching elements $40a$, $42a$ in this case engage in the fastening shapes $26a$, 28a, 30a, 32a and thus also prevent a movement of the wiper blade adapter 12a relative to the retaining element 10a in the longitudinal direction 22a.

Figure 5:
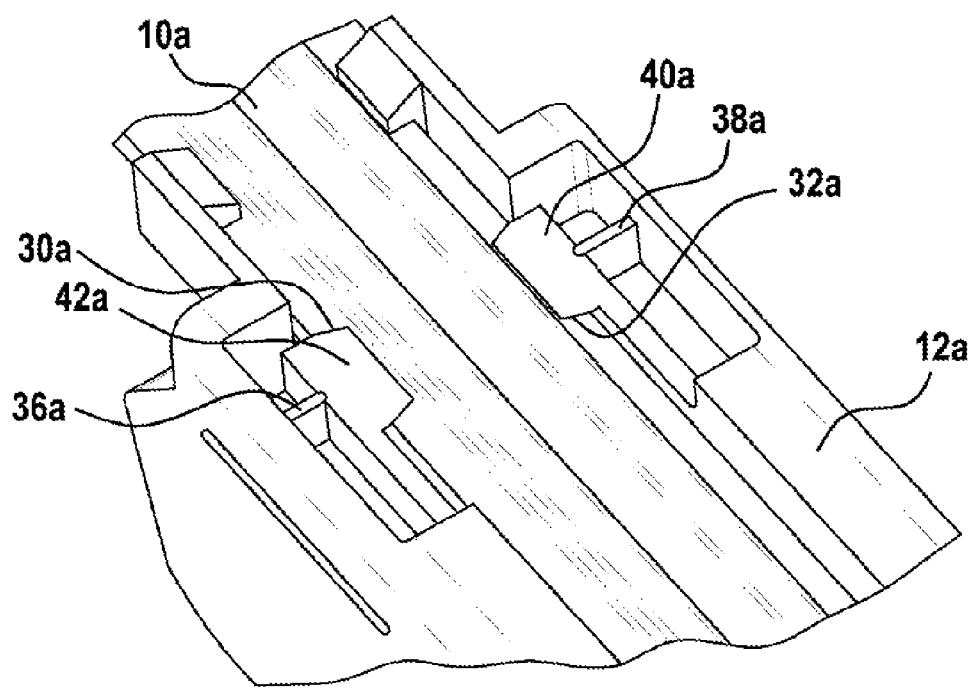
FIG. 5 shows a perspective detailed view of the wiper blade adapter and the retaining element according to FIG. 4.

The latching elements 40a, 42a during the mounting process are initially deflected from an initial position in a wiping direction 24a in a spring-elastic manner and subsequently move back automatically into the initial position. In this case, two securing means 36a, 38a of the wiper blade adapter 12a in each case act laterally on one of the latching elements 40a, 42a and prevent further deflection of the latching elements 40a, 42a (FIG. 5). The securing means 36a, 38a in this case may be respectively deflected about a pivot axis which extends parallel to a vertical direction 44a. If the latching elements 40a, 42a are intended to be deflected from the mounted state, the securing means 36a, 38a have to be initially deflected.

Two further exemplary embodiments of the invention are shown in FIGS. 6 to 11. The following descriptions are substantially limited to the differences between the exemplary embodiments, wherein reference may be made to the description of the first exemplary embodiment relative to components, features and functions which remain the same. To differentiate between the exemplary embodiments, the letter a in the reference numerals of the exemplary embodiment in FIGS. 1 to 5 is replaced by the letters b and c in the reference numerals of the exemplary embodiments in FIGS. 6 to 11. Relative to components which are identified as the same, in particular relative to components with the same reference numerals, in principle reference may also be made to the drawings and/or the description of the first exemplary embodiment.

Figure 6:
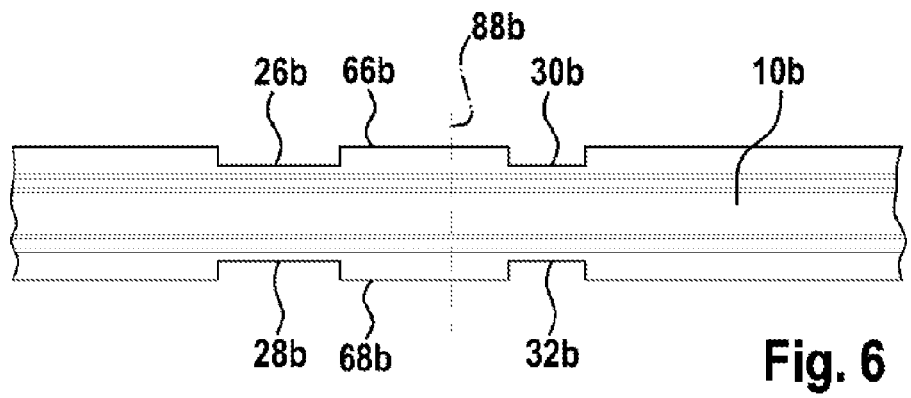
FIG. 6 shows a plan view of a further exemplary embodiment of a wiping device according to the invention comprising a retaining element.

FIG. 6 shows a plan view of a retaining element 10b of a further exemplary embodiment of a wiping device. The retaining element 10b corresponds in cross section to the retaining element 10a shown in FIG. 2. The retaining element 10b has a mounting code 34b which exactly defines an explicit mounting position with a wiper blade adapter 12b. To this end, the retaining element 10b has four fastening shapes 26b, 28b, 30b, 32b, which are configured as fastening recesses. In the mounted state, the fastening shapes 26b, 28b, 30b, 32b form a positive connection with a wiper blade adapter 12b. The fastening shapes 26b, 28b, 30b, 32b are arranged in lateral walls 66b, 68b which laterally define a longitudinal guide channel 18b. On each side of the retaining element 10b facing in a wiping direction, two fastening shapes 26b, 28b and/or 30b, 32b have rectangular contours which are configured differently from one another, whereby exactly one explicit mounting position is defined by a wiper blade adapter 12b. By means of the different contours, the retaining element 10b is configured asymmetrically to a central plane 88b extending perpendicular to the longitudinal direction 22b of the retaining element 10b. The fastening shapes 26b, 28b, 30b, 32b are partially arranged in the lateral wall 66b, 68b which laterally defines the longitudinal guide channel 18b. The fastening shapes 26b, 28b have different longitudinal dimensions. In this case, the maximum longitudinal dimension of the fastening shapes 26b, 28b is 62% larger than the maximum longitudinal dimension of the fastening shapes 30b, 32b. The fastening shapes 26b and/or 28b are arranged offset relative to the fastening shapes 30b and/or 32b, viewed in the longitudinal direction 22b.

For mounting, the wiper blade adapter 12b is pushed in the longitudinal direction 22b onto the retaining element 10b. The wiper blade adapter 12b has four latching elements 40b, 42b, which in a mounted state bear laterally against the spring element 20b and prevent a movement of the wiper blade adapter 12b relative to the spring element 20b in the longitudinal direction 22b.

Figure 7:
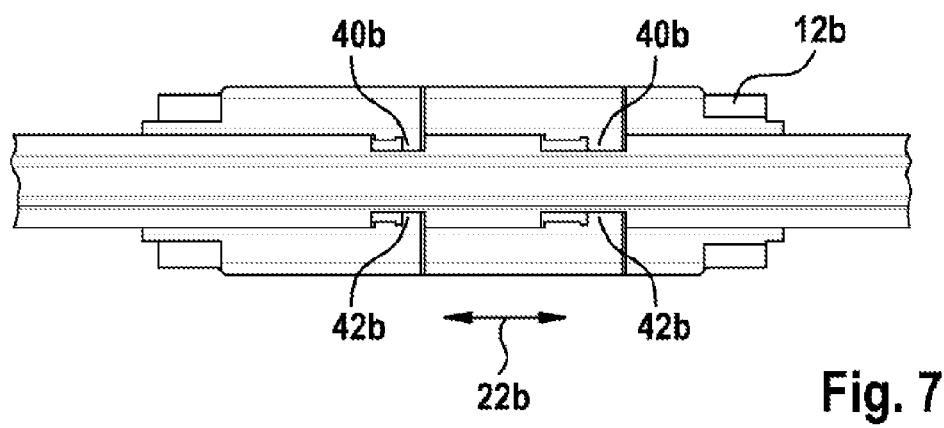
FIG. 7 shows a plan view of the retaining element according to FIG. 6 comprising a wiper blade adapter.

The latching elements 40b, 42b bear in a mounted state laterally against the retaining element 10b (FIG. 7). The latching elements 40b, 42b in this case engage in the fastening shapes 26b, 28b and thus also prevent a movement of the wiper blade adapter 12b relative to the retaining element 10b in the longitudinal direction 22b. Moreover, the wiper blade adapter 12b engages in the fastening shapes 26b, 30b and thus forms a further positive connection acting in the longitudinal direction 22b. The latching elements 40b, 42b during the mounting process are initially deflected in a spring-elastic manner from an initial position in the wiping direction 24b and subsequently move back automatically into the initial position.

Figure 8:
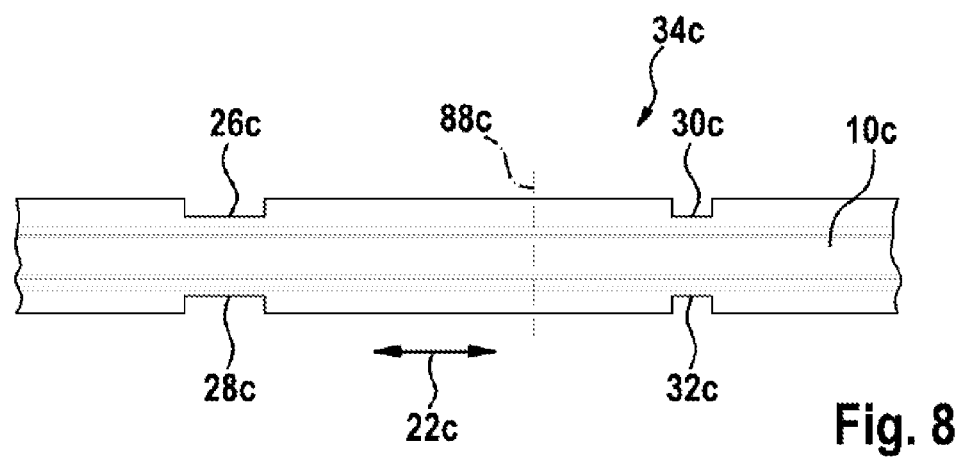
FIG. 8 shows a plan view of a further exemplary embodiment of a wiping device according to the invention comprising a retaining element.

FIG. 8 shows a plan view of a retaining element 10c of a further exemplary embodiment of a wiping device. The retaining element 10c corresponds in cross section to the retaining element 10a shown in FIG. 2. The retaining element 10c has a mounting code 34c which exactly defines an explicit mounting position with a wiper blade adapter 12c. To this end, the retaining element 10c has four fastening shapes 26c, 28c, 30c, 32c which are configured as fastening recesses. The fastening shapes 26c, 28c, 30c, 32c form in the mounted state a positive connection with the wiper blade adapter 12c. The fastening shapes 26c, 28c, 30c, 32c are arranged in lateral walls 66c, 68c which laterally define a longitudinal guide channel 18c. On each side of the retaining element 10c facing in a wiping direction, two fastening shapes 26c, 28c and/or 30c, 32c have rectangular contours which are configured differently from one another, whereby exactly one explicit mounting position is defined by the wiper blade adapter 12c. By means of the different contours, the retaining element 10c is configured asymmetrically relative to a central plane 88c extending perpendicular to a longitudinal direction 22c of the retaining element 10c. The fastening shapes 26c, 28c, 30c, 32c are partially arranged in the lateral wall 66c, 68c which laterally defines the longitudinal guide channel 18c. The fastening shapes 26c, 28c have different longitudinal dimensions. In this case, the maximum longitudinal dimension of the fastening shapes 26c, 28c in each case is double the size of the maximum longitudinal dimension of the fastening shapes 30c, 32c. The fastening shapes 26c and/or 28c are arranged offset relative to the fastening shapes 30c and/or 32c, viewed in the longitudinal direction 22c.

Figure 9:
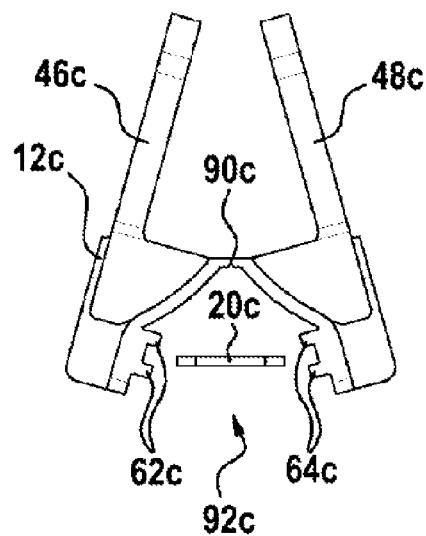
FIG. 9 shows a sectional view through a wiper blade adapter and a spring element of a wiping device according to FIG. 8.

FIG. 9 shows a section through the wiper blade adapter 12c, wherein the cutting plane extends perpendicular to the longitudinal direction 22c. The wiper blade adapter 12c is formed from two lateral parts 46, 48 which are pivotably connected together via a rotary joint 90c. During a mounting process, the lateral parts 46c, 48c are deflected about a pivot axis, wherein two vertical retaining means 62c, 64c of the lateral parts 46c, 48c are moved away from one another and open a receiver region 92c for receiving a spring element 20c and the retaining element 10c. The pivot axis extends in this case parallel to the longitudinal direction 22c. For reasons of clarity the retaining element 10c is not shown in FIGS. 9 and 10.

Figure 10:
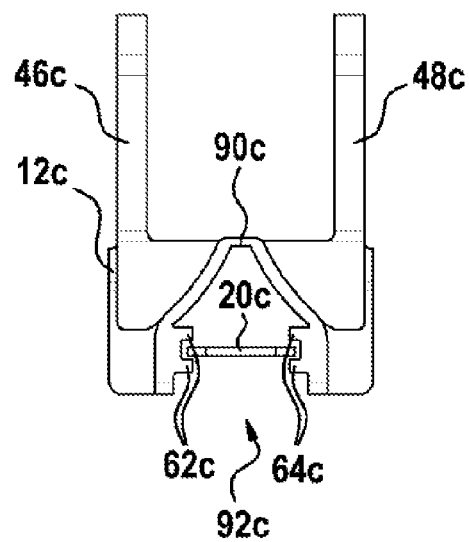
FIG. 10 shows a sectional view through the wiper blade adapter and a spring element of a wiping device according to FIG. 9
Figure 11:
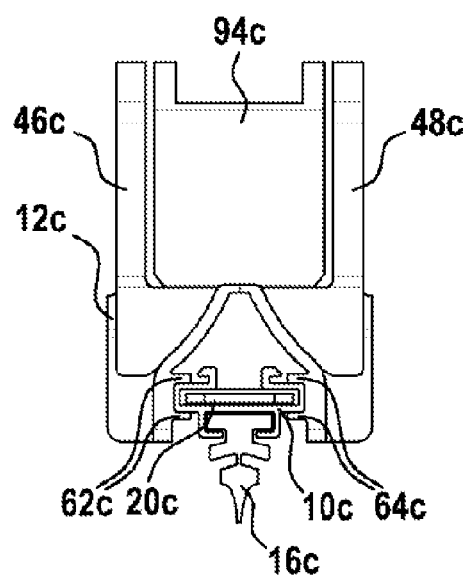
FIG. 11 shows a sectional view through the wiper blade adapter, a retaining element and a spring element of a wiping device according to FIG. 10.

In a further mounting step, the lateral parts 46c, 48c are pivoted back about the pivot axis, wherein the two vertical retaining means 62c, 64c come to bear against the spring element 20c and against the retaining element 10c (FIG. 10, FIG. 11). Four fastening means of the wiper blade adapter 12c engage in this case in the fastening shapes 26c, 28c, 30c, 32c. A securing member 94c is now introduced between the lateral parts 46c, 48c on a side of the rotary joint 90c remote from the wiper strip and bears against the lateral parts 46c, 48c. The side parts 46c, 48c are thereby prevented from pivoting back. The spring element 20c and the retaining element 10c are secured in the vertical direction 44c, in the wiping direction 24c and in the longitudinal direction 22c.

What is claimed is:

1. A wiping device, comprising a retaining element (10a-10c) which has at least one longitudinal guide channel (18a-18c) for guiding at least one spring element (20a-20c) along a longitudinal direction (22a-22c), characterized in that the retaining element (10a-10c) has at least one mounting code (34a-34c) which is provided to define exactly one explicit mounting position with a wiper blade adapter (12a-12c), wherein the retaining element (10a-10c) comprises at least two fastening recesses (26a-26c, 28a-28c, 30a-30c, 32a-32c) which have contours of different size or shape and are provided to define the exactly one explicit mounting position with the wiper blade adapter (12a-12c), and wherein the retaining element (10a-10c) is configured asymmetrically to a central plane (88a-88c) extending perpendicular to the longitudinal direction (22a-22c) of the retaining element (10a-10c).

2. The wiping device as claimed in claim 1, characterized in that the at least two fastening recesses (26a-26c, 28a-28c, 30a-30c, 32a-32c) are arranged at least partially in at least one lateral wall (66a-66c, 68a-68c) which laterally defines the longitudinal guide channel (18a-18c).

3. The wiping device as claimed in claim 1, characterized in that the at least two fastening recesses (26a-26c, 28a-28c, 30a-30c, 32a-32c) have different longitudinal dimensions.

4. The wiping device as claimed in claim 1, characterized in that the at least two fastening recesses (26a-26c, 28a-28c, 30a-30c, 32a-32c) are arranged offset to one another, viewed in the longitudinal direction (22a-22c).

5. The wiping device as claimed in claim 1, further comprising a wiper blade adapter (12a-12c) coupled to the retaining element (10a-10c).

6. The wiping device as claimed in claim 5, characterized in that the wiper blade adapter (12a; 12b) has at least two latching elements (40a; 40b, 42a; 42b) which bear laterally into the at least two fastening recesses (26a-26c, 28a-28c, 30a-30c, 32a-32c) in a mounted state and prevent a movement of the wiper blade adapter (12a; 12b) relative to the retaining element (10a; 10b) in the longitudinal direction (22a; 22b).

7. The wiping device as claimed in claim 6, characterized by at least one securing means (36a, 38a) for securing the at least two latching elements (40a, 42a) in an operating state.

8. The wiping device of claim 7, wherein the at least one securing means (36a, 38a) acts laterally on the at least two latching elements (40a, 42a) in the operating state to prevent deflection of the at least two latching elements (40a, 42a).

9. The wiping device as claimed in claim 6, wherein each of the at least two fastening elements (40a; 40b, 42a; 42b) has a different overall longitudinal length which corresponds to an overall longitudinal length of one of the at least two fastening recesses (26a-26c, 28a-28c, 30a-30c, 32a-32c).

10. The wiping device as claimed in claim 1, further comprising a wiper strip fastened to the retaining element.

11. The wiping device as claimed in claim 1, wherein the at least two fastening recesses (26a-26c, 28a-28c, 30a-30c, 32a-32c) have contours with different overall longitudinal lengths.

12. The wiping device of claim 1, wherein the at least two fastening recesses (26a-26c, 28a-28c, 30a-30c, 32a-32c) includes a first fastening recess (26a) having a first overall longitudinal length, a second fastening recess (28a) disposed opposite the first fastening recess (26a) and having a second overall longitudinal length equal to the first overall longitudinal length, a third fastening recess (30a) longitudinally offset from the first fastening recess (26a) and having a third overall longitudinal length less than the first overall longitudinal length, and a fourth fastening recess (32a) disposed opposite the third fastening recess (30a) and having a fourth overall longitudinal length equal to the third overall longitudinal length.

13. A wiping device comprising a wiper blade adapter, a wiper strip, and a retaining element (10a-10c) fastened to the wiper strip, the retaining element having a longitudinal guide channel (18a-18c) extending along a longitudinal direction (22a-22c) having therein a spring element (20a-20c), and the retaining element (10a-10c) having at least one mounting code (34a-34c) which is provided to define exactly one explicit mounting position with the wiper blade adapter (12a-12c), wherein the retaining element (10a-10c) comprises at least two fastening recesses (26a- 26c, 28a-28c, 30a- 30c, 32a- 32c) which have contours of different size or shape and are provided to define the exactly one explicit mounting position with the wiper blade adapter (12a-12c), wherein the wiper blade adapter (12-12c) includes at least two latching elements of different size or shape (40a; 40b, 42a; 42b) that bear laterally into the at least two fastening recesses (26a-26c, 28a-28c, 30a-30c, 32a-32c) to prevent a movement of the wiper blade adapter (12a; 12b) relative to the retaining element (10a; 10b) in a longitudinal direction (22a; 22b), wherein the retaining element (10a-10c) is configured asymmetrically to a central plane (88a-88c) extending perpendicular to a longitudinal direction (22a- 22c) of the retaining element (10a-10c).

14. The wiping device as claimed in claim 13, characterized in that the at least two fastening recesses (26a-26c, 28a-28c, 30a-30c, 32a-32c) are arranged at least partially in at least one lateral wall (66a- 66c, 68a- 68c) which laterally defines the longitudinal guide channel (18a-18c).

15. The wiping device as claimed in claim 13, characterized in that the at least two fastening recesses (26a-26c, 28a-28c, 30a-30c, 32a-32c) have different longitudinal dimensions.

16. The wiping device as claimed in claim 13, characterized in that the fastening recesses (26a-26c, 28a-28c, 30a-30c, 32a-32c) are arranged offset to one another, viewed in the longitudinal direction (22a-22c).

17. The wiping device as claimed in claim 13, further comprising at least one securing means (36a, 38a) for securing the at least two latching elements (40a, 42a) in an operating state.

18. The wiping device of claim 17, wherein the at least one securing means (36a, 38a) acts laterally on the at least two latching elements (40a, 42a) in the operating state to prevent deflection of the at least two latching elements (40a, 42a).

19. The wiping device as claimed in claim 13, wherein the at least two fastening recesses (26a-26c, 28a-28c, 30a-30c, 32a-32c) have contours with different overall longitudinal lengths.

20. The wiping device as claimed in claim 13, wherein each of the at least two fastening elements (40a; 40b, 42a; 42b) has a different overall longitudinal length which corresponds to an overall longitudinal length of one of the at least two fastening recesses (26a-26c, 28a-28c, 30a-30c, 32a-32c).

21. The wiping device of claim 13, wherein the at least two fastening recesses (26a-26c, 28a-28c, 30a-30c, 32a-

32c) includes a first fastening recess (26a) having a first overall longitudinal length, a second fastening recess (28a) disposed opposite the first fastening recess (26a) and having a second overall longitudinal length equal to the first overall longitudinal length, a third fastening recess (30a) longitudinally offset from the first fastening recess (26a) and having a third overall longitudinal length less than the first overall longitudinal length, and a fourth fastening recess (32a) disposed opposite the third fastening recess (30a) and having a fourth overall longitudinal length equal to the third overall longitudinal length.

22. A wiping device, comprising a retaining element (10a-10c) which has at least one longitudinal guide channel (18a-18c) for guiding at least one spring element (20a-20c) along a longitudinal direction (22a-22c), characterized in that the retaining element (10a-10c) has at least one mounting code (34a-34c) which is provided to define exactly one explicit mounting position with a wiper blade adapter (12a-12c), wherein the retaining element (10a-10c) comprises at least two fastening recesses (26a-26c, 28a-28c, 30a-30c, 32a-32c) which have contours of different size or shape and are provided to define the exactly one explicit mounting position with the wiper blade adapter (12a-12c), wherein the wiping device further includes a wiper blade adapter (12a-12c) coupled to the retaining element (10a-10c), wherein the wiper blade adapter (12a; 12b) has at least two latching elements (40a; 40b, 42a; 42b) which bear laterally into the at least two fastening recesses (26a-26c, 28a-28c, 30a-30c, 32a-32c) in a mounted state and prevent a movement of the wiper blade adapter (12a; 12b) relative to the retaining element (10a; 10b) in the longitudinal direction (22a; 22b), wherein the wiping device includes at least one securing means (36a, 38a) for securing the at least two latching elements (40a, 42a) in an operating state, and wherein the at least one securing means (36a, 38a) acts laterally on the at least two latching elements (40a, 42a) in the operating state to prevent deflection of the at least two latching elements (40a, 42a).

23. A wiping device comprising a wiper blade adapter, a wiper strip, and a retaining element (10a-10c) fastened to the wiper strip, the retaining element having a longitudinal guide channel (18a-18c) extending along a longitudinal direction (22a-22c) having therein a spring element (20a-20c), and the retaining element (10a-10c) having at least one mounting code (34a-34c) which is provided to define exactly one explicit mounting position with the wiper blade adapter (12a-12c), wherein the retaining element (10a-10c) comprises at least two fastening recesses (26a-26c, 28a-28c, 30a-30c, 32a-32c) which have contours of different size or shape and are provided to define the exactly one explicit mounting position with the wiper blade adapter (12a-12c), wherein the wiper blade adapter (12-12c) includes at least two latching elements of different size or shape (40a; 40b, 42a; 42b) that bear laterally into the at least two fastening recesses (26a-26c, 28a-28c, 30a-30c, 32a-32c) to prevent a movement of the wiper blade adapter (12a; 12b) relative to the retaining element (10a; 10b) in a longitudinal direction (22a; 22b), wherein the wiping device further includes at least one securing means (36a, 38a) for securing the at least two latching elements (40a, 42a) in an operating state, and wherein the at least one securing means (36a, 38a) acts laterally on the at least two latching elements (40a, 42a) in the operating state to prevent deflection of the at least two latching elements (40a, 42a).

* * * * *